(12) United States Patent
Bellamy

(10) Patent No.: US 6,209,025 B1
(45) Date of Patent: *Mar. 27, 2001

(54) INTEGRATED VIDEO SYSTEM

(76) Inventor: John C Bellamy, 141 Meadowcreek, Coppell, TX (US) 75019

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/188,914

(22) Filed: Nov. 9, 1998

(51) Int. Cl.[7] .................. H04N 7/16; H04N 7/173; G06F 15/16
(52) U.S. Cl. ................ 709/217; 348/12; 348/13; 348/7
(58) Field of Search ................ 348/10, 552, 12, 348/13, 7; 455/6.2, 6.3, 5.1, 4.2; 345/327; H04N 7/16, 7/173

(56) References Cited

U.S. PATENT DOCUMENTS

| 5,512,935 | * | 4/1996 | Majeti et al. ............... 348/9 |
| 5,574,964 | | 11/1996 | Hamlin . |
| 5,594,491 | | 1/1997 | Hodge et al. . |
| 5,650,831 | | 7/1997 | Farwell . |
| 5,675,390 | | 10/1997 | Schindler et al. . |
| 5,678,012 | | 10/1997 | Kimmich et al. . |
| 5,682,511 | | 10/1997 | Sposato et al. . |
| 5,722,041 | | 2/1998 | Freadman . |
| 5,724,106 | | 3/1998 | Autry et al. . |
| 5,727,129 | | 3/1998 | Barrett et al. . |
| 5,734,835 | | 3/1998 | Selker . |
| 5,748,255 | | 5/1998 | Johnson et al. . |
| 5,761,280 | | 6/1998 | Noonen et al. . |
| 5,774,664 | | 6/1998 | Hidary et al. . |
| 5,778,181 | * | 7/1998 | Hidary et al. ............... 709/218 |
| 5,790,115 | | 8/1998 | Pleyer et al. . |
| 5,790,201 | | 8/1998 | Antos . |
| 5,791,992 | | 8/1998 | Crump et al. . |
| 5,805,806 | | 9/1998 | McArthur . |
| 5,900,867 | * | 5/1999 | Schindler et al. ............ 345/327 |
| 5,929,849 | * | 7/1999 | Kikinis ...................... 345/327 |
| 5,949,765 | * | 9/1999 | Deadman et al. ............ 370/271 |

* cited by examiner

Primary Examiner—Nathan Flynn
Assistant Examiner—Vivek Srivastava

(57) ABSTRACT

The present invention relates to the general matter of integration of Internet services and telephony services with a video display (e.g., a television set). In a preferred embodiment, the invention utilizes a personal computer for system intelligence with a connection from a set top box to receive enhanced feature requests originating from a user remote control device. The personal computer processes the requests and generates pop-up windows which are sent back to the set top box for insertion into the video image as interactive displays simultaneously with the entertainment content already found in the video image.

11 Claims, 4 Drawing Sheets

INTEGRATED VIDEO SYSTEM

BACKGROUND OF THE INVENTION

It is well known that personal computers (PCs) can provide users with access to a vast array of information and services via the Internet. Conventional PC access to the Internet, however, suffers some limitations such as: 1) the need to first establish a dial-up connection to an Internet service provider (ISP); 2) the need to access a particular information provider (e.g., an electronic mail server or a financial reporting service) to learn if there is information of particular interest to the user; 3) the need to be at the PC location to access such information using the PC keyboard and to see the information on the PC monitor; and 4) the need for the PC user to be relatively sophisticated in the use of the PC and the Internet to get the desired information or services. One of the known approaches that has become popular in overcoming some of these limitations is the incorporation of Internet access functionality into a television set or a CATV set top box. Such implementations are commonly referred to as PCTV or WEB TV. A major limitation of the PCTV approach to simplifying Internet access is that it does not use a PC that is already in the residence or other location in need of user-friendly information or services. The PCTV offering is typically much less capable than contemporary PC hardware and likely to be out of date with rapidly advancing PC technology.

Another example of known attempts to integrate television and PC computing is disclosed in U.S. Pat. No. 5,790,201, entitled: "Television and Computer Capability Integration." This patent discloses a coupler for selectively choosing one of two user interfaces to a computer. A primary interface consists of a conventional CRT or other computer monitor, keyboard, mouse, joystick, etc. A secondary interface consists of a television set and additional input devices such as keyboard, mouse, joystick, etc. The primary interface allows the user to use the computer in a conventional manner—presumably while seated in front of the CRT monitor. Selecting the secondary interface allows the user to use the computer with a conventional television set as a monitor and the additional input devices—presumably while seated in front of the television. Only one of the two interfaces is enabled at any particular time. Thus, this disclosure does not allow simultaneous viewing of the television with computer interaction. Furthermore, there is no possibility of having the computer inform the user of the occurrence of telephony/Internet related events while the user is watching television and not using the secondary user interface.

Another area of consumer communications services achieving increasing user acceptance is enhanced telephone features such as caller ID, call waiting, call forwarding and network based voice messaging. Although these features are useful in their present offerings their usefulness and convenience is limited by the method of accessing them via a telephone and viewing them, in the case of caller ID, with a display associated with the telephone set itself. Mechanisms have become available to display caller ID information on a TV screen such as: "TV Messenger" from TriNexus or "TI 3000 Caller ID on TV" from Palco Telecom (both in Canada). These mechanisms enable displaying incoming call information on the television screen but provide no mechanism for the television viewer to interact with the system other than to access the telephone directly.

Yet another area of emerging communications technology is the use of the Internet for voice communications commonly referred to as "Internet telephony (IT)." The prevailing method of offering such services is through dial-up connections to a service provider that essentially uses the Internet as a long-distance network for phone conversations. Two limitations of contemporary IT services are: 1) the need to dial a local telephone number before dialing the eventual destination; and 2) the possibility that the user may not know ahead of time if a particular destination can be reached via the selected IT service provider.

Because of the limitations and independent operation of the aforementioned systems it is desirable to provide a new system configuration that enhances the accessibility and user friendliness of the individual service offerings and provides new services based on the functional combination of the separate systems.

SUMMARY OF THE INVENTION

The present invention relates to the general matter of integration of Internet services and telephony services with a video display (e.g., a television set). In a preferred embodiment, the invention utilizes a personal computer for system intelligence with a connection from a set top box to receive enhanced feature requests originating from a user remote control device. The personal computer processes the requests and generates pop-up windows which are sent back to the set top box for insertion into the video image as interactive displays simultaneously with the entertainment content already found in the video image.

BRIEF DESCRIPTION OF THE DRAWINGS

The features and advantages derived from the invention will become readily apparent from the following detailed description of the preferred embodiments with reference to the appended drawings in which.

DETAILED DESCRIPTION

The invention will be described in detail with reference to the preferred embodiments illustrated in FIGS. 1–7. The invention is described herein in its preferred application to an integration of Internet and telephony services. However, the invention may be applicable to any type or configuration of communications services that require the display of and interaction with information for a user.

Figure 1:
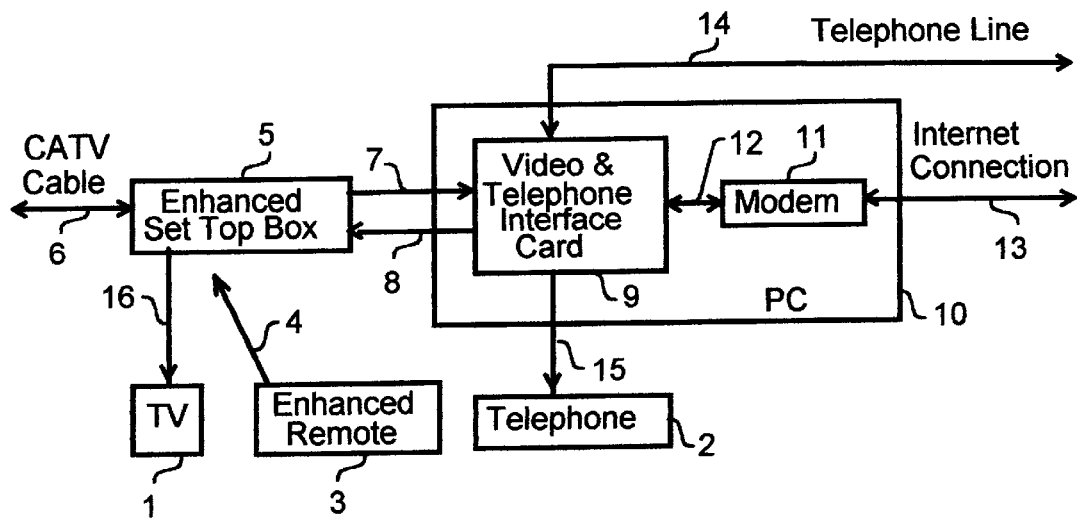
FIG. 1 illustrates an integrated video system in accordance with a preferred embodiment of the invention.

As shown by the preferred embodiment depicted in FIG. 1, the invention is directed to a system that provides integrated, user-friendly communications systems access. In this embodiment, user access to the system is provided through a conventional television set 1, a conventional telephone 2, and an enhanced remote (ER) 3. Enhanced remote 3 operates in the same manner as any conventional remote control device (e.g., TV/VCR remote) with the exception that special buttons or operational modes have been added (or programmed in) to provide access and control of the system's enhanced features. Enhanced remote 3 communicates via communications link 4 to an enhanced set-top box (ESTB) 5. Communications link 4, as well as any communications or data link described herein, can be any known communications link known in the art. For example, the links described herein may be either a wireless transmission path such as an infrared link, an RF link, an ultrasonic link, or a wired transmission path such as a copper wire, coaxial cable, fiber optic channel, etc.

ESTB 5 provides the basic capabilities of a conventional set-top box with respect to a CATV input 6 (which generically represents any audio/video television input such as broadcast cable, digital broadcast satellite, video cassette recorder/player, video disc player, etc.) and TV output 16. In accordance with a preferred embodiment of the invention, however, ESTB 5 is implemented with the added capability of forwarding commands from ER 3 to a video & telephone interface card (VTIC) 9 in PC 10 utilizing data link 7. (The ER commands may also be received directly by PC 10 or relayed by any other known device separate from ESTB 5). ESTB 5 is also configured to accept as an input a video window from VTIC 9 over video window link 8. ESTB 5 inserts the video window from video window link 8 into the video image provided to TV 1 to produce the pop-up window on the TV screen simultaneously with the entertainment content of the original video image. The pop-up window is inserted into the video image using techniques similar to those used to generate picture-in-picture (PIP) screens in commercially available television sets. It should be noted, however, that the pop-up window is displayed on TV 1 whether or not TV 1 has built-in PIP capabilities. Furthermore, the pop-up window can contain text, graphics, PC application windows, or any combination of these.

For illustrative purposes, the configuration of FIG. 1 utilizes a conventional dial-up modem 11 for access via telephone line 13. Any other device for providing a communications or data link with the Internet may also be used, however. Modem 11 communicates with VTIC 9 via data link 12 which is preferably implemented using the well-known Peripheral Component Interconnect (PCI) bus of the PC, although any other known protocol or communication link may be used. Telephone access is provided via telephone line 14 which can be a conventional telephone line (e.g., twisted pair, Asymmetric Digital Subscriber Line, ISDN Basic Rate, etc.) having any variety of telephone data services, preferably having at least caller ID data services. In any event, the user can place or receive telephone calls from external telephone line 14 through VTIC 9 and extension connection 15 to telephone 2.

As mentioned above, ER 3 can be implemented to operate in at least two different ways. The first way is to use special buttons dedicated to enhanced services. These special buttons cause new remote control codes to be sent to ESTB 5 over and above the remote control codes used for conventional set top box operations. ESTB 5 merely forwards the special remote control codes to VTIC 9 via data link 7.

A second implementation for ER 3 is to use existing buttons on a conventional remote but define one particular button or sequence of buttons to place ER 3 into and out of an enhanced services mode of operation. The enhanced services mode of operation causes ESTB 5 to forego normal ESTB processing of the ER 3 remote control codes and instead pass them through to VTIC 9. In the preferred embodiment, the user will know which state the ER 3 is in by a display of an indication of the mode of operation on the TV screen.

More sophisticated remote control devices or other input devices can be provided as system options are added. One such more sophisticated remote control device could contain a full alphanumeric keyboard or a mouse/trackball capability. If ER 3 is not implemented with an alphanumeric keyboard, alphanumeric data entry can still be accomplished with a "virtual" keyboard which involves scrolling through alphanumeric entries in a pop-up window and clicking on desired characters.

ESTB 5 implementation requirements may vary depending on how various functions are partitioned between ESTB 5 and VTIC 9. One of the most flexible ways of partitioning the functions is to make ESTB 5 as transparent as possible with respect to enhanced services. A transparent ESTB 5 can be easily implemented by starting with the design of a conventional set top box (STB) and adding the transparency operation. To be transparent with respect to enhanced commands the controller in the conventional STB is reprogrammed to pass the new commands onto data link 7 but retain processing functions for commands related to conventional STB operations. Data link 7 can also be implemented in a variety of ways known in the art. One of the simplest, for example, is as a conventional serial asynchronous data link as a microprocessor peripheral IC or directly available in many microprocessors such as an Intel 8051. To be transparent with respect to pop-up window displays pertaining to enhanced services, ESTB receives all information pertaining to the pop-up windows on video window link 8 and merely inserts the specified video window into the video image sent to TV 1.

In particular, although any one of the numerous formats or techniques known in the art for inserting input signals such as the pop-up window information on data link 8 into a TV signal for display are possible, the preferred implementation utilizes a digital array of pixel values. Each pixel value contains 16 bits for 16 color digital displays. In one embodiment, for example, the first information transferred is four parameters: x-start, y-start, x-range, y-range. Following these parameters are x-range*y-range pixel values arranged as y-range rows and x-range columns. The first two parameters (x-start, y-start) define the starting position of the pop-up window relative to the total display size (e.g., 480×720 pixels). The pop-up window information is stored in a DRAM memory element of ESTB 5. In the preferred implementation, a digital TV signal is assumed which means that a digital multiplexer is used to select pop-up pixels whenever the pixel location (x,y) of the video generation process is in the range (x-start<=x<x-start+x-range) and (y-start<=y<y-start+y-range). Otherwise, pixel information from the main digital video signal is selected. The digital multiplexer may be any one of the known or commercially available products such as the AViA-GTX advanced graphics integrated circuit from C-Cube Microsystems that provides the digital multiplexing function and DRAM interface, or the CH8438B Triple 8-bit DAC with Color Space Conversion and Analog MUX from Chrontel.

Figure 2:
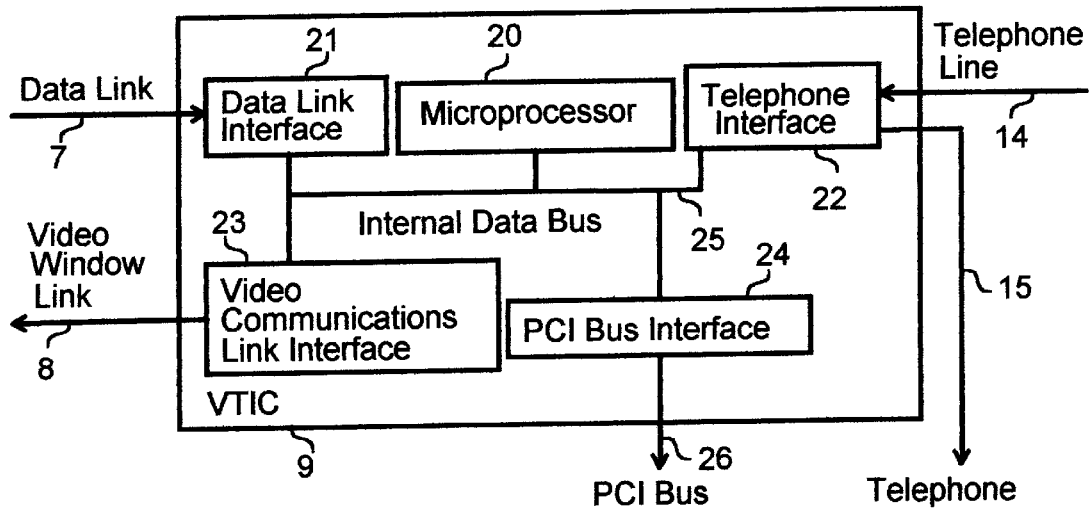
FIG. 2 shows a preferred embodiment of the video & telephone interface card (VTIC) used in the integrated video system of FIG. 1.

In one preferred embodiment VTIC 9 is composed of microprocessor 20, data link interface 21, telephone interface 22, video communications link interface 23, and PCI bus interface 24, as shown in FIG. 2. Microprocessor 20 can be any commercially available microprocessor programmed to control the various parts on the board and to process the enhanced video and telephone services. Microprocessor 20 may also be replaced by an external processor such as the PC processor that may operate to control the components of the VTIC 9 at the same time as it controls the other components of the PC. Microprocessor 20 is operable to process ER 3 commands received in Data Link Interface 21. As mentioned previously, one embodiment of Data Link 7 is a simple asynchronous serial data link, in which case, it is possible that Data Link Interface 21 might be contained within microprocessor 20 itself. Indeed, any one or more of these components may be combined in a manner known in the art to perform the same functions in one or more combined modules.

Telephone Interface circuit 22 utilizes relays, discrete components, and integrated circuits as is standard practice for modems and PBX line card interfaces to the telephone lines 14, 15 used in conjunction with the implementation of the invention. In the preferred embodiment, a digital signal processor (DSP) integrated circuit is also provided in interface circuit 22 for performing voice compression, speakerphone processing, facsimile conversions, and other telephony operations. Such DSP functions are well known in the art and are commonly provided in voice/fax/modem cards for PC's. (Good speakerphone performance may require an external speaker and microphone not shown.) An additional capability that could be programmed into the DSP circuit (or added as an external device) as an enhanced option is speech recognition for the detection of voice activated commands. Such speech recognition capability would permit the control of PC 10 and/or ESTB 5 in lieu of (or complementary to) the PC keyboard and ER 3.

One additional integrated circuit needed for a fully featured VTIC 9 is a circuit to receive information (e.g., caller identification information) from telephone services subscribed to by the user. An example of such a circuit is an Incoming Calling Line Identification Receiver with Ring Detection (ICS 1660) as available from Integrated Circuit Systems, Inc. Other implementations of incoming caller ID services are possible. The Service Manual of System 2000 2-Line Caller ID (catalog number 43-972) from Radio Shack, for example, which is incorporated herein by reference, provides a complete schematic and parts list for a telephone line interface and a caller ID module that may be used in implementing the invention. In a preferred embodiment, VTIC 9 also provides a metallic, automatic connection between external line 14 and extension line 15. This connection allows the user to retain full use of the telephone line without activating the system whenever the PC is turned off or is otherwise not operational.

Video Communications Link Interface 23 is preferably implemented as a serial data link wherein a data block represents a pixel array of a desired pop-up window. Included with the data block is a set of parameters defining the location and size of the pop-up window. ESTB 5 processes the video window information by multiplexing (i.e., inserting) the pixel information into the TV video signal 16. The multiplexing function can be accomplished on analog or digital signals. (The AViA-GTX part mentioned previously supports digital multiplexing while the CH8438B uses analog multiplexing.) Other formats for Video Link 8 are possible.

PCI Bus Interface 24 may be implemented using any integrated circuit or other device known in the art for providing access to the standard PC bus. Internal Data Bus 25 of VTIC 9 is used by microprocessor 20 to communicate with each of the various components of VTIC 9.

Figure 3:
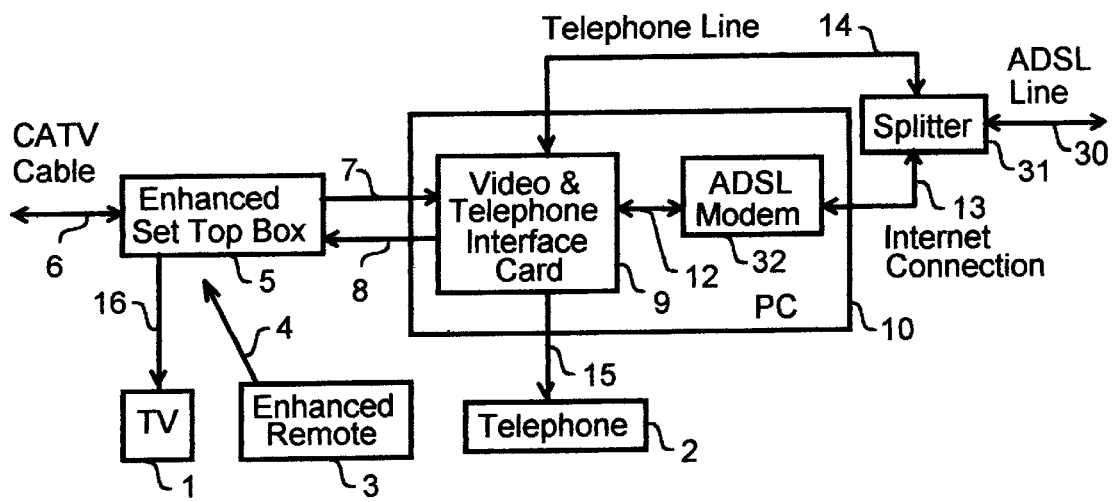
FIG. 3 depicts an integrated video system utilizing an asymmetric digital subscriber line (ADSL) in accordance with another preferred embodiment of the invention.

As mentioned in the background discussion, dial-up access to an ISP is not the most desirable means of getting connected to the Internet. Permanent on-line connections are more desirable for two reasons: 1) spontaneous short information retrievals such as telephone directory numbers are facilitated; and 2) the network can send unsolicited messages to a user whenever particular events occur such as electronic mail arrival, or updates to select sites are made. FIG. 3 depicts one alternate configuration that utilizes an Asymmetric Digital Subscriber Loop (ADSL) connection 30 to the Internet, although other high capacity links may also be provided (e.g., ISDN, satellite, cable modem, etc.).

ADSL is a standardized digital access technology utilizing a single conventional telephone wire pair to simultaneously carry a conventional analog voice channel and a permanently connected digital data channel. As shown, splitter 31 is used to externally separate the two channels. Some ADSL implementations may not require the use of an external splitter but instead incorporate the splitter into the interface card electronics, ADSL modem 32. The data channel is similarly separated at the central office subscriber line interface where it is multiplexed with other ADSL data channels and connected to an ISP using a leased line as opposed to a switched connection through the public switched telephone network—thus achieving a permanent connection.

Figure 4:
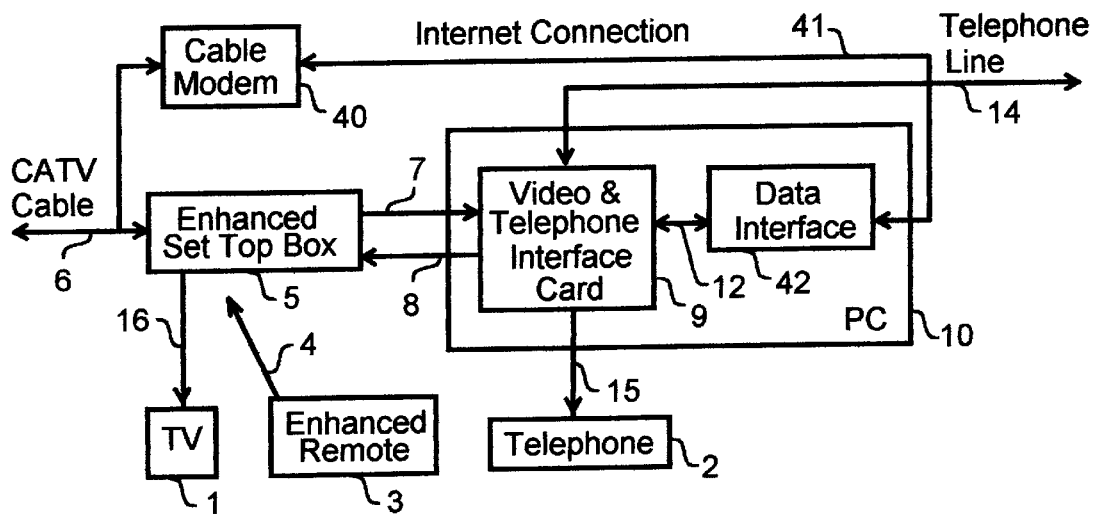
FIG. 4 illustrates an integrated video system utilizing a cable modem in accordance with yet another preferred embodiment of the invention.

FIG. 4 depicts another configuration that provides a permanent data connection for Internet access. In this preferred embodiment, a cable modem 40 is used in place of dial-up modem 11 of FIG. 1. In one embodiment, CATV input 6 utilizes selected frequency bands to carry bi-directional data channels for individual subscribers in addition to broadcast video. (Other cable modem configurations known in the art may equally be utilized.) The individual data channels are multiplexed and demultiplexed at the CATV head end and carried to and from an ISP on leased lines in similar fashion to the ADSL ISP interface. In this manner, the cable modem configuration provides permanent Internet access. The Internet connection 41 in FIG. 4 is shown to be provided through data interface card 42. An alternate implementation could incorporate the cable modem interface within ESTB 5, directly on VTIC 9 or elsewhere within PC 10.

The following illustrations describe in exemplary fashion user feature interactions and system processing steps. In all cases, it is assumed that an Internet connection exists—either through a dial-up modem or via a permanent connection such as through an ADSL line, cable modem, or other known mechanism.

Incoming Telephone Call

A call arrives on telephone line 14 and VTIC 9 detects the ringing status and the caller ID information which consists of a calling telephone number and the caller'bs name, if available. (In an optional mode of operation when the caller's name is not available or not provided as part of the subscribed service from the telephone company, one of several Internet sites that provide reverse telephone number look-up can be accessed to retrieve the caller's name. A further optional mode allows the user to store caller names and associated phone numbers in a look-up table that can be accessed to provide a given caller's name based on the input calling telephone number.) At the very least, the identity of the area code can be determined by a look-up table. In response to the call detection, VTIC 9 generates a pop-up window containing the calling number information and a set of user configurable options for handling the call. The pop-up window is transferred on video link 8 to ESTB 5 whereupon it is inserted into the video image sent to TV 1. From the list of options displayed, the user selects an option using a button or buttons on ER 3. An example of possible options include: 1) answer the call; 2) have the system take a message, 3) forward the call, or 4) reject the call. The code of the selected option is transferred by ESTB 5 to VTIC 9 via data link 7. VTIC 9 passes the command to a software program running in PC 10 which acts on the selected option.

Telephone Directory Calling

The user presses one or more buttons on ER 3 to activate an Internet directory search. ESTB 5 passes the codes related to the desired directory search to VTIC 9. VTIC 9 passes the command to an Internet browser program running in PC 10 which accesses a telephone directory site. (Any of a number of telephone directory sites can be pre-configured for selection by this command.) VTIC 9 generates a pop-up window containing the interactive image of the browser for display by TV 1. The user enters alphanumeric data (e.g., name and location) related to the desired telephone number using an alphanumeric keyboard, virtual keyboard, speech recognition, or other input device as the case may be. If the desired telephone number is encountered, the user can enter a dial command option via ER 3 whereupon a software program in PC 10 controls VTIC 9 to dial the selected telephone number for telephone 2.

Incoming Email Message

An electronic mail message is transferred from an ISP to a mail program running in PC 10. Upon receipt, PC 10 passes the message (or an indication of its arrival) to VTIC 9 for output in a pop-up window with the mail programs image and appropriate options for processing the message (e.g., reply, reply all, forward, save, delete, etc.). The pop-up window thus is passed to ESTB 5 and displayed on TV 1. The user can thereupon interact with the mail program using enhanced feature buttons of ER 3.

Real-Time Information Banner

Electronic mail events are just one example of unsolicited events that are usefully displayed on the user's TV screen. Numerous Internet sites offer delivery of unsolicited events such as breaking news, stock quotes, sports events, etc. using, for example, the so-called "Push" technology (e.g., Pointcast). The system configurations described previously easily support such functions as a semi-permanent window (or portion of a window) in one portion of the TV screen or as a pop-up window that can be enabled or disabled with enhanced feature buttons on ER 3.

Voice Message Inbox Processing

Voice messaging operations associated with the system can be significantly enhanced by displaying a directory of messages on the TV screen at the request of a user. The ability to see the complete state of a voice messaging inbox including message duration, times of arrival, and origins, permit expedient and informed processing of the messages. Associated with the inbox display are user options allowing for processing such as: listen, delete, save, or forward. In situations where a user subscribes to a network-based answering service, as opposed to storing messages internally in the system, it is also possible for the service provider to send inbox information via the Internet or other data communications facility to effect the same capabilities. An additional option is an integrated inbox which displays voice, email and fax messages and options for processing each.

Internet Telephony

The described system facilitates voice transmission in at least two ways. First, a user can specify a desired telephone number using any of a number of methodologies: 1) directly entering a number with ER 3; 2) using ER 3 to select an entry in a speed dial list contained in a pop-up window; 3) using ER 3 in combination with voice commands to specify the number; 4) dialing a number with the dial pad of telephone 2 or the keyboard (or other input device) of PC 10; or 5) any combination of these input methods. In any case, an Internet telephony program running in PC 10 can process the desired number (possibly in cooperation with an Internet telephony server) and determine if the desired number can be reached through the Internet. If the desired number is available through the Internet, the call is placed and VTIC 9 provides the appropriate speech compression algorithm to send and receive digitized speech through Internet connection 13.

If the desired telephone number is not accessible through the Internet or there is no desire to place it over the Internet, the system can place the call over telephone line 14, as well known in the art. Notice that this method of placing the call does not require the user to know ahead of time if a particular voice telephone number is available through the Internet. The system can be set up to designate what calls should be attempted through the Internet. For example, Internet calls may be limited to certain known telephone numbers associated with Internet receivers, to calls for long-distance (international, domestic, or both), or to calls having certain quality rating, cost factor, time of day, or other cost/benefit analysis formulation.

Second, the described system may be used to access an Internet site with a voice connection option (e.g., a help desk). The user can merely click on the voice connection option which causes both ends to establish the Internet voice connection without having to dial a telephone number. The user of the system merely picks up the handset of telephone 2 after clicking on the voice connection option (or, in the case where a speaker phone is used, the user is immediately able to converse).

While the invention has been described in detail in connection with the best mode of the invention known at the time of the filing of this application, it should be readily understood that the invention is not limited to the specified embodiments described herein. Rather, the invention can be modified to incorporate any number of variations, alterations, substitutions or equivalent arrangements not heretofore described, which are commensurate with the spirit and scope of the invention. For example, in the alternative configuration shown in FIG. 7, the VTIC functions are incorporated into ESTB 5. Communications between the VTIC circuitry inside ESTB 5 and the PC occur over a conventional PC serial link 61 with serial link interface circuitry 62 inside the PC. The advantage of this configuration is that no special cards have to be added to the PC. (A serial interface 62 is often available for such functions as external modems.)

Persons of ordinary skill in the art will recognize that there are numerous other alternatives as to how the functional components of the described system are partitioned and how the individual components communicate with each other. One alternative, for example, is to use an enhanced video cassette recorder (EVCR) in place of ESTB 5. Functions and interfaces to the EVCR would be identical or similar to the functions and interfaces described for ESTB 5. Another similar alternative is to use an enhanced television (ETV) in place of ESTB 5. Functions and interfaces to the ETV would be identical or similar to the functions and interfaces described for ESTB 5. Specifically, the ETV remote would have new commands that get passed by the ETV to VTIC 9. VTIC 9, in turn, sends a video window back to ETV for insertion into the displayed image.

Yet another alternative is to use a separate box dedicated to enhanced services. This box may be essentially identical to an ESTB. This box could be connected in series between a conventional set top box and a television set, or between the conventional set top box and the PC. In the alternative, the box may include all of the ESTB capabilities, but add the capabilities of VTIC 9 and other components used in PC 10 to facilitate operation of the invention. Accordingly, the box may be connected among a conventional STB, a conventional PC, and a conventional TV.

Figure 5:
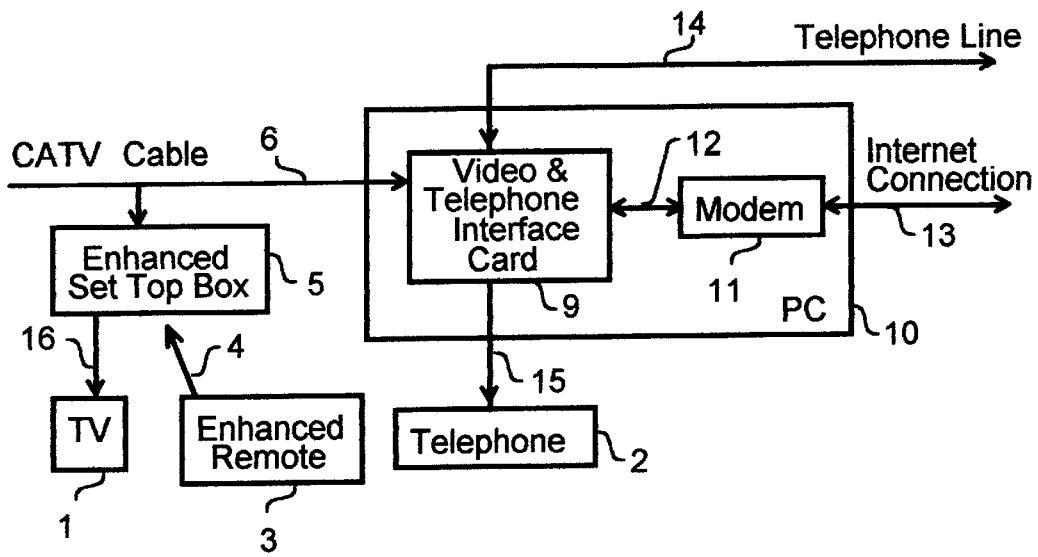
FIG. 5 shows an integrated video system utilizing a coaxial cable in accordance with a further preferred embodiment of the invention.

Another alternative configuration is depicted in FIG. 5 which is a configuration that utilizes coaxial cable 6 for communication between ESTB 5 and PC 10 in lieu of data link 7 and video link 8. The configuration of FIG. 5 sends the same information between these system elements but does so with frequency division multiplexed (FDM) or time division multiplexed (TDM) channels allocated to the respective communication transfers. This configuration is advantageous in that it provides more flexibility in the physical locations of ESTB 5 and PC 10.

Figure 6:
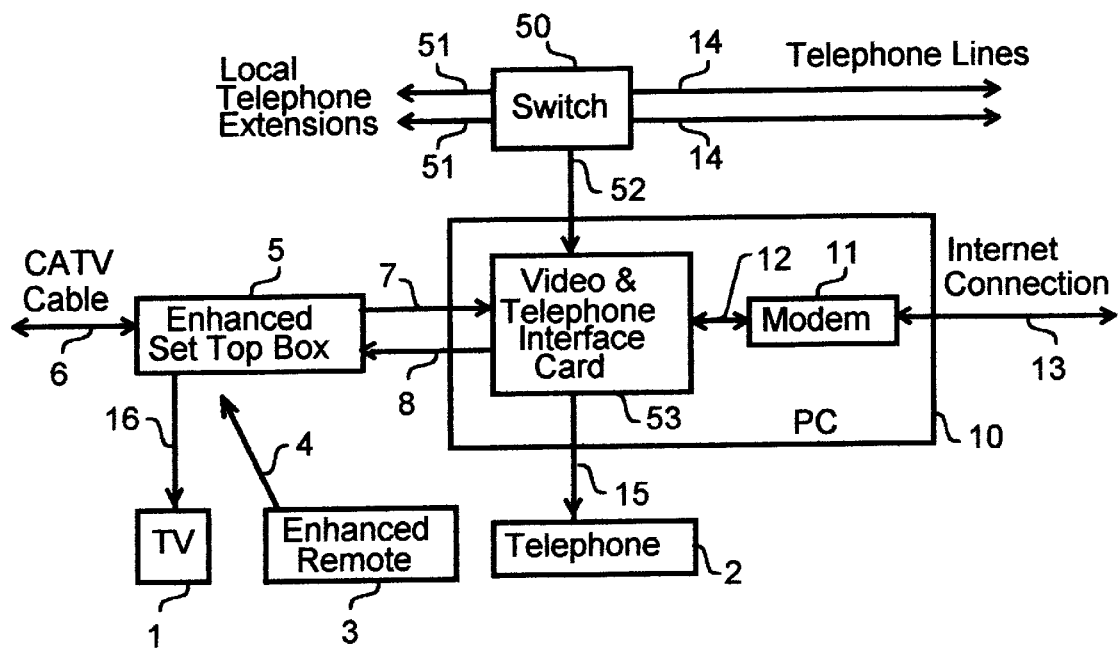
FIG. 6 depicts an integrated video system utilizing a telephony application programming interface (TAPI) in accordance with another preferred embodiment of the invention.
Figure 7:
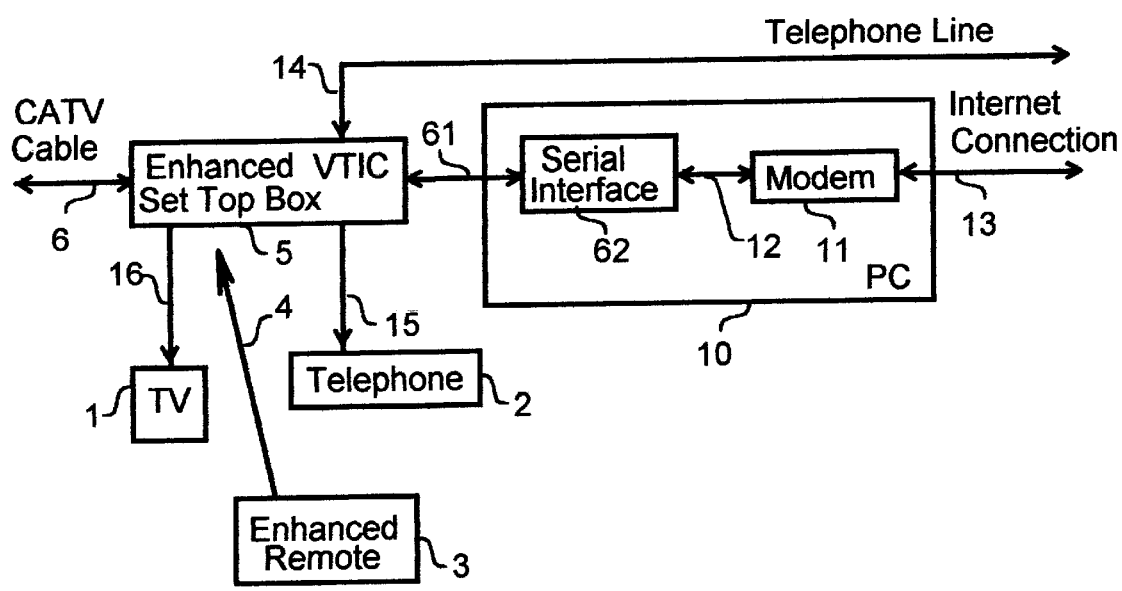
FIG. 7 illustrates yet another preferred embodiment of an integrated video system in accordance with the invention.

An alternative implementation for the telephone interface involves the use of Computer Telephone Integration (CTI) technology in lieu of the single line interface disclosed as part of VTIC 9. A basic configuration for this alternative is shown in FIG. 6. This configuration uses a standardized Telephony Application Programming Interface (TAPI) 52 between a telephone switching system 50 and a different version of a VTIC, VTIC 53. TAPI interface 52 allows PC 10 to monitor and control switching operations within switching system 50. Examples of switching systems with TAPI interfaces are the commercially available Nitsuko America DS01, Onyx, and 124i/384i systems. These systems have been designed specifically for PC control of telephone operations—including access to caller ID information. TAPI programming information is readily available in the industry. The 1998 Addison Welsley book: *Windows Telephony Programming: A Developer's Guide to TAPI* by Chris Wells, which is incorporated herein by reference, is one source of such information. Besides getting access to caller ID information the configuration of FIG. 6 allows the user to direct an incoming call on one of telephone lines 14 to an extension line 51 through menu selections with ER 3.

As a further addition, the dial-up or other connection with the Internet could easily be replaced to provide for the connection with extranets, intranets, local area networks, or other communication networks known in the art. The incoming/outgoing telephone lines 14, 15 may be any wired (or even wireless) lines known for transporting telephone signals such as analog (copper, twisted pair), digital (ISDN, T1, fiber optic), CATV cable modem, etc. Many of the features (e.g., speech recognition) disclosed as being programmed into VTIC 9, can similarly be incorporated (in whole or part) into PC 10 or ESTB 5.

Although specific commercially available components used to practice the invention have been identified, substitution of one or more other make or model components that satisfy the minimum structural and/or functional aspects of the invention as set forth herein is contemplated for use in practicing the invention. Accordingly, the invention is not limited by the foregoing description, but is only limited by the scope of the appended claims.

What is claimed as new and desired to be protected by Letters Patent of the United States is:

1. An integrated Internet and telephony video system comprising:

a personal computer having a modem for transferring information signals between the Internet and said personal computer, and a video/telephone interface card for receiving Internet and telephony information signals, the video/telephone interface card outputting a video window containing the Internet and telephony information signals;

an enhanced set top box, coupled to and separated from said personal computer through a data link and a video window link, said enhanced set top box receiving a plurality of video source signals from a broadcast video source and the video window output from the video/telephone interface card of said personal computer over the video window link, said enhanced set top box generating television (TV) images based on selected ones of the plurality of video source signals and the video window output from the video/telephone interface card;

a television (TV) set displaying TV images generated by said enhanced set top box for display on a TV screen of said TV set, wherein said video window appears on the TV screen as a pop-up window displayed on the TV screen together with the TV images based on the selected ones of the plurality of video source signals; and a remote control device outputting at least one of a plurality of remote control command signals, the plurality of remote control command signals used to interactively control operation of said enhanced set top box and said personal computer based on the TV images displayed on the TV screen, wherein said enhanced set top box passes to the video/telephone interface card over the data link to said personal computer remote control commands output from the remote control that are designated for control of said personal computer.

2. The integrated Internet and telephony video system of claim 1 wherein said remote control device uses specific buttons dedicated to control operation of said personal computer.

3. The integrated Internet and telephony video system of claim 1 wherein said remote control device uses particular button sequences dedicated to control operation of said personal computer.

4. The integrated Internet and telephony video system of claim 1 wherein the video/telephone interface card contains a telephone line interface circuit used to process telephone information signals and relay the information signals to said enhanced set top box.

5. The integrated Internet and telephony video system of claim 4 wherein the telephone information signals relayed by the telephone line interface circuit includes caller identification information which is included in a pop-up window displayed on the TV screen.

6. The integrated Internet and telephony video system of claim 1 wherein the modem in said personal computer is an asymmetrical digital subscriber line (ADSL) modem used to transfer information signals between the Internet and said personal computer.

7. The integrated Internet and telephony video system of claim 1 wherein the broadcast video source is cable television (CATV), and wherein the CATV broadcast video source also provides connectivity to the Internet.

8. The integrated Internet and telephony video system of claim 1 wherein said personal computer and said enhanced set top box are connected via coaxial cable and utilize a frequency division multiplex (FDM) protocol to effect communications.

9. The integrated Internet and telephony video system of claim 1, further comprising:
- a telephone switch for receiving incoming telephone signals and relaying the received telephone signals among local telephone extensions and said personal computer; and
- a telephony application programming interface (TAPI), coupled between said telephone switch and the video/telephone interface card of said personal computer, said TAPI operative to allow said personal computer to monitor and control switching operations of the incoming telephone signals.

10. The integrated Internet and telephony video system of claim 1, wherein said remote control device is connected to said enhanced set top box with a copper wire guided transmission media.

11. An integrated Internet and telephony video system comprising:
- a personal computer having a modem for transferring information signals between the Internet and said personal computer, and a video/telephone interface card for receiving Internet and telephony information signals from the modem, the video/telephone interface card outputting a video window containing the Internet and telephony information signals;
- an enhanced set top box, coupled to and separated from said personal computer through a data link and a video window link, said enhanced set top box receiving a plurality of video source signals from a broadcast video source and the video window output from the video/telephone interface card of said personal computer over the video window link, said enhanced set top box generating television (TV) images based on selected ones of the plurality of video source signals and the video window output from the video/telephone interface card;
- a television (TV) set displaying TV images generated by said enhanced set top box for display on a TV screen of said TV set, wherein said video window appears on the TV screen as a pop-up window displayed on the TV screen together with the TV images based on the selected ones of the plurality of video source signals; and
- a remote control device outputting at least one of a plurality of remote control command signals, the plurality of remote control command signals used to interactively control operation of said enhanced set top box and said personal computer based on the TV images displayed on the TV screen, wherein said enhanced set top box passes to the video/telephone interface card over the data link to said personal computer remote control commands output from the remote control that are designated for control of said personal computer;
- wherein said video/telephone interface card comprises a data link interface receiving personal computer remote control commands passed by said enhanced set top box, and a microprocessor processing the remote control commands received through said data link interface, a telephone interface transferring telephony signals, a video communications link interface transferring video information to said enhanced set top box, and an interface coupled to said personal computer.

\* \* \* \* \*